(12) United States Patent  
Carroll

(10) Patent No.: US 8,972,756 B2
(45) Date of Patent: Mar. 3, 2015

(54) SYSTEM AND METHOD FOR COMPUTER POWER CONTROL

(75) Inventor: Ted A. Carroll, Seattle, WA (US)

(73) Assignee: Aptean Systems, LLC, Atlanta, GA (US)

( * ) Notice: Subject to any disclaimer, the term of this patent is extended or adjusted under 35 U.S.C. 154(b) by 0 days.

(21) Appl. No.: 13/603,303

(22) Filed: Sep. 4, 2012

(65) Prior Publication Data

US 2013/0067261 A1 Mar. 14, 2013

Related U.S. Application Data

(63) Continuation of application No. 12/400,696, filed on Mar. 9, 2009, now Pat. No. 8,281,166.

(60) Provisional application No. 61/035,307, filed on Mar. 10, 2008.

(51) Int. Cl.
 *G06F 1/00* (2006.01)
 *G06F 1/32* (2006.01)

(52) U.S. Cl.
 CPC ............ *G06F 1/3203* (2013.01); *G06F 1/3246* (2013.01); *G06F 1/3287* (2013.01); *Y02B 60/1278* (2013.01); *Y02B 60/1282* (2013.01)
 USPC ............................ 713/310; 713/300; 713/323

(58) Field of Classification Search
 USPC .................................................. 713/300–340
 See application file for complete search history.

(56) References Cited

U.S. PATENT DOCUMENTS

| | | | |
|---|---|---|---|
| 5,666,538 A * | 9/1997 | DeNicola ...................... | 713/320 |
| 5,933,647 A | 8/1999 | Aronberg et al. | |
| 6,260,111 B1 | 7/2001 | Craig et al. | |
| 6,408,395 B1 | 6/2002 | Sugahara et al. | |
| 6,574,740 B1 * | 6/2003 | Odaohhara et al. ........... | 713/323 |
| 6,654,895 B1 | 11/2003 | Henkhaus et al. | |
| 6,801,811 B2 | 10/2004 | Ranganathan et al. | |
| 6,892,313 B1 | 5/2005 | Codilian et al. | |
| 6,986,064 B2 | 1/2006 | Yoshimoto et al. | |
| 7,171,458 B2 | 1/2007 | Brown et al. | |
| 7,222,039 B2 * | 5/2007 | Wilcox et al. ................. | 702/117 |

(Continued)

FOREIGN PATENT DOCUMENTS

| | | | |
|---|---|---|---|
| EP | 1850564 A1 | 10/2007 | |
| EP | 2311239 B1 * | 8/2012 | ............. H04L 29/08 |

(Continued)

OTHER PUBLICATIONS

Intelligent Power Control Method; IBM Technical Disclosure Bulletin; vol. 38; No. 8; Published Aug. 1, 1995; TDB-Acc-No: NN9508187; Cross Reference: 0018-8689-38-8-187; 2 pages.

(Continued)

*Primary Examiner* — Faisal M Zaman
(74) *Attorney, Agent, or Firm* — Lowe Graham Jones PLLC; Ellen M. Bierman

(57) ABSTRACT

Provided herein is a computer implemented system for managing power supply for an electronic device. The system includes computer a learning component that is trained and constructs models according to usage patterns of the electronic device, a component providing a first phase of model building relating to usage of the electronic device; and a forecasting component that employs the learning component and models to generate predictions relating to usage of the electronic device.

28 Claims, 2 Drawing Sheets

(56) References Cited

U.S. PATENT DOCUMENTS

| | | | |
|---|---|---|---|
| 7,249,269 B1* | 7/2007 | Motoyama | 713/320 |
| 7,260,106 B2 | 8/2007 | Yavatkar et al. | |
| 7,308,591 B2 | 12/2007 | Dubinsky | |
| 7,472,298 B1 | 12/2008 | Kimmel et al. | |
| 7,752,470 B2 | 7/2010 | Huang et al. | |
| 8,055,915 B2 | 11/2011 | Klazynski et al. | |
| 8,181,021 B2* | 5/2012 | Ginter et al. | 713/164 |
| 8,281,166 B2* | 10/2012 | Carroll | 713/310 |
| 2003/0005341 A1* | 1/2003 | Terunuma | 713/310 |
| 2003/0145242 A1* | 7/2003 | Derocher et al. | 713/320 |
| 2004/0243865 A1* | 12/2004 | Owen et al. | 713/320 |
| 2005/0268131 A1 | 12/2005 | Matsunobu | |
| 2005/0278322 A1* | 12/2005 | Fan et al. | 707/5 |
| 2006/0224579 A1* | 10/2006 | Zheng | 707/5 |
| 2006/0230144 A1* | 10/2006 | Shah | 709/225 |
| 2006/0259621 A1* | 11/2006 | Ranganathan et al. | 709/226 |
| 2006/0259803 A1* | 11/2006 | Edwards et al. | 713/320 |
| 2007/0050654 A1* | 3/2007 | Switzer et al. | 713/320 |
| 2007/0192641 A1* | 8/2007 | Nagendra et al. | 713/320 |
| 2007/0263246 A1 | 11/2007 | Bressan et al. | |
| 2007/0283178 A1* | 12/2007 | Dodeja et al. | 713/324 |
| 2008/0002603 A1* | 1/2008 | Hutsell et al. | 370/318 |
| 2008/0005736 A1 | 1/2008 | Apacible et al. | |
| 2008/0028239 A1 | 1/2008 | Rapps et al. | |
| 2008/0059820 A1* | 3/2008 | Vaden et al. | 713/320 |
| 2008/0070652 A1* | 3/2008 | Nguyen et al. | 463/1 |
| 2008/0109663 A1* | 5/2008 | Snyder et al. | 713/300 |
| 2009/0144577 A1* | 6/2009 | Sarker | 713/340 |
| 2010/0115309 A1* | 5/2010 | Carvalho et al. | 713/320 |
| 2010/0241888 A1 | 9/2010 | Kaneko et al. | |
| 2011/0004575 A1 | 1/2011 | Yang et al. | |
| 2011/0231320 A1 | 9/2011 | Irving | |
| 2011/0296220 A1 | 12/2011 | Arai | |
| 2012/0116600 A1 | 5/2012 | Schmid et al. | |

FOREIGN PATENT DOCUMENTS

| | | | | |
|---|---|---|---|---|
| JP | 2002-312079 A | 10/2002 | | |
| JP | 2003-169462 A | 6/2003 | | |
| JP | 2003-345469 A | 12/2003 | | |
| JP | 2007-198994 A | 8/2007 | | |
| WO | WO 2012036672 A1 * | 3/2012 | | H04B 1/66 |
| WO | WO 2013174451 A1 * | 11/2013 | | G06F 9/50 |

OTHER PUBLICATIONS

Minsoo Lee, et al.; Intelligent Power Management Device with Middleware Based Living Pattern Learning for Power Reduction; IEEE Transactions on Consumer Electronics; vol. 55; No. 4; Nov. 2009; pp. 2081-2089, 9 pages.

Jian Qiu, et al.; Energy Level Based Transmission Power Control Scheme for Energy Harvesting WSNs; Institute of Computer Application Technology; IEEE Globecom 2011 Proceedings; 6 pages.

Zhiyuan Ren, et al.; Hierarchical Adaptive Dynamic Power Management; IEEE Transactions on Computers; vol. 54; No. 4; Apr. 2005; pp. 409-420; 12 pages.

* cited by examiner

SYSTEM AND METHOD FOR COMPUTER POWER CONTROL

CROSS-REFERENCE TO RELATED APPLICATIONS

This application is a continuation of application Ser. No. 12/400,696, filed Mar. 9, 2009, entitled "System and Method for Computer Power Control", which claims the benefit of U.S. Provisional Application No. 61/035,307, filed Mar. 10, 2008, entitled "System and method for Computer Power Control", which applications are incorporated herein by reference in their entirety.

BRIEF SUMMARY

One embodiment provides a computer implemented system for managing power supply for an electronic device, comprising the following computer executable components: a learning component that is trained and constructs models according to usage patterns of the electronic device, a component providing a first phase of model building relating to usage of the electronic device; and a forecasting component that employs the learning component and models to generate predictions relating to usage of the electronic device.

Another embodiment provides a system wherein the electronic device is a computer.

Yet another embodiment provides a system wherein the forecasting component generates a predicted usage profile.

A further embodiment provides a system wherein the predicted usage profile is matched with a power profile and components of the computer are powered on or off based on the predicted usage profile.

Still another embodiment provides a system wherein the predicted usage profile comprises a discretization of usage data, whereby the size of usage tables is reduced.

The systems and methods provided herein contemplate other methods of quantization of data. One advantage of such methods is reduction in the size of the tables required for implementing some of the features described herein.

One embodiment provides a system the predicted usage profile comprises states selected from "unused," and "used".

In one embodiment, the system may employ a user-configured power usage scheme when the predicted usage profile indicates an "unused" state and the system maintains the electronic device powered on or in an "on" state when the predicated usage profile is predicting a "used" state. One advantage is that the user is provided for a tool to adopt an aggressive power usage scheme while taking advantage of the option provided by the system in suspending the user-configured power usage scheme when the system predicts a "used" state.

Still another embodiment provides a system wherein the predicted usage profile comprises states selected from one or more of "unused," "light usage," and "heavy usage".

A further embodiment provides a system wherein the power profile keeps all peripherals on and the system ready to use during a "heavy usage" period.

One embodiment provides a system wherein the predicted usage profile comprises indication of device "heavy usage" and selection of a power scheme that keeps all peripherals and the device on and ready to use.

Another embodiment provides a system wherein the predicted usage profile comprises indication of device "light usage" and selection of a power scheme that powers off some peripherals after a predetermined period of inactivity to conserve power.

Yet another embodiment provides a system wherein the predicted usage profile comprises indication of "unused" device, and selection of a power scheme that powers off or hibernates the entire system after a predetermined period of inactivity.

It should be noted that a particular power scheme may be applied as a result of the predicted profile.

In one embodiment the forecasting component determines complementary information relating to how long a system is expected to be in "heavy use," "light use" or "unused."

Another embodiment provides a system further comprising predicting a wake up profile whereby the system is powered on.

Another embodiment provides a system wherein the learning component includes one or more probabilistic learning models for reasoning about the usage states.

Yet another embodiment provides a system wherein the learning component includes one or more of a statistical model, a mathematical model, a simple model, a simple probability model, non-stationary Markov chains, a Bayesian dependency model, a naive Bayesian classifier, Bayesian networks, a times series model, a decision trees model, a Support Vector Machine (SVMs), a neural network, a probabilistic model, and a Hidden Markov Model.

Another embodiment provides a computer implemented method for managing power supply for an electronic device, comprising the following computer executable steps:
  i) providing historical usage data;
  ii) training a learning component to construct models according to usage patterns of the electronic device,
  iii) providing a first phase of model building relating to usage of the electronic device;
  iv) generating predicted usage profile relating to usage of the electronic device; and
  v) incorporating the usage profile into a power scheme for power supply to the device.

Another embodiment provides a method wherein the electronic device is a computer.

Another embodiment provides a method further comprising discretization of usage data, whereby the size of usage tables is reduced.

One embodiment provides a system the predicted usage profile comprises states selected from "unused," and "used".

Another embodiment provides a method wherein the predicted usage profile comprises states selected from one or more of "unused," "light usage," and "heavy usage".

One embodiment provides a method wherein the predicted usage profile comprises indication of device "heavy usage" and selection of a power scheme that keeps all peripherals and the device on and ready to use.

Another embodiment provides a method wherein the predicted usage profile comprises indication of device "light usage" and selection of a power scheme that powers off some peripherals after a predetermined period of inactivity to conserve power.

Yet another embodiment provides a method wherein the predicted usage profile comprises indication of "unused" device, and selection of a power scheme that powers off or hibernates the entire system after a predetermined period of inactivity.

Another embodiment provides a method further comprising including complementary information relating to how long a system is expected to be in "heavy use," "light use" or "unused."

Another embodiment provides a method further comprising predicting a wake up profile whereby the system is powered on.

Another embodiment provides a method comprising one or more probabilistic learning models for reasoning about the usage states.

Another embodiment provides a method wherein the learning model includes one or more a statistical model, a mathematical model, a simple model, a simple probability model, non-stationary Markov chains, a Bayesian dependency model, a naive Bayesian classifier, Bayesian networks, a times series model, a decision trees model, a Support Vector Machine (SVMs), a neural network, a probabilistic model, and a Hidden Markov Model.

Another embodiment provides a method wherein the learning model includes a naive Bayesian model.

DETAILED DESCRIPTION

Aspects of the present invention are described as follows.

Figure 1:
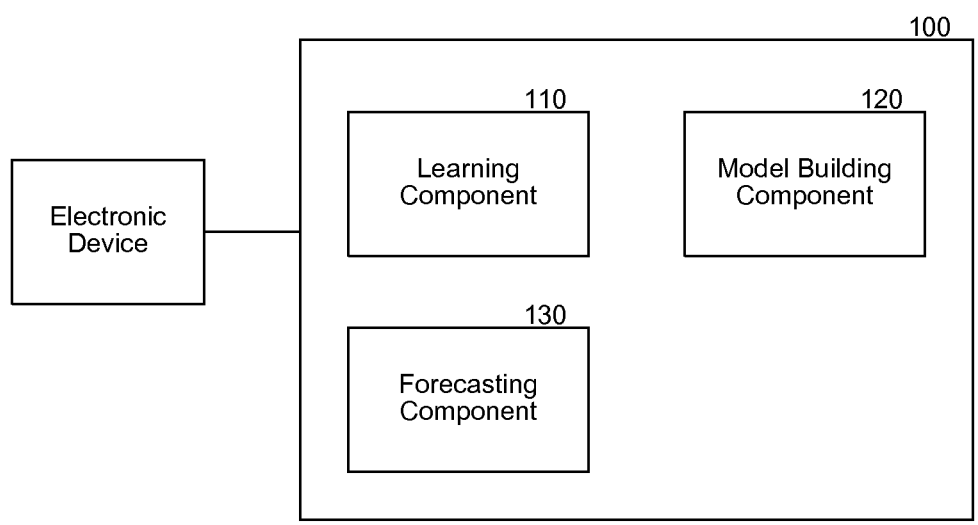
FIG. 1 is a block diagram of a system for managing power supply for an electronic device.
Figure 2:
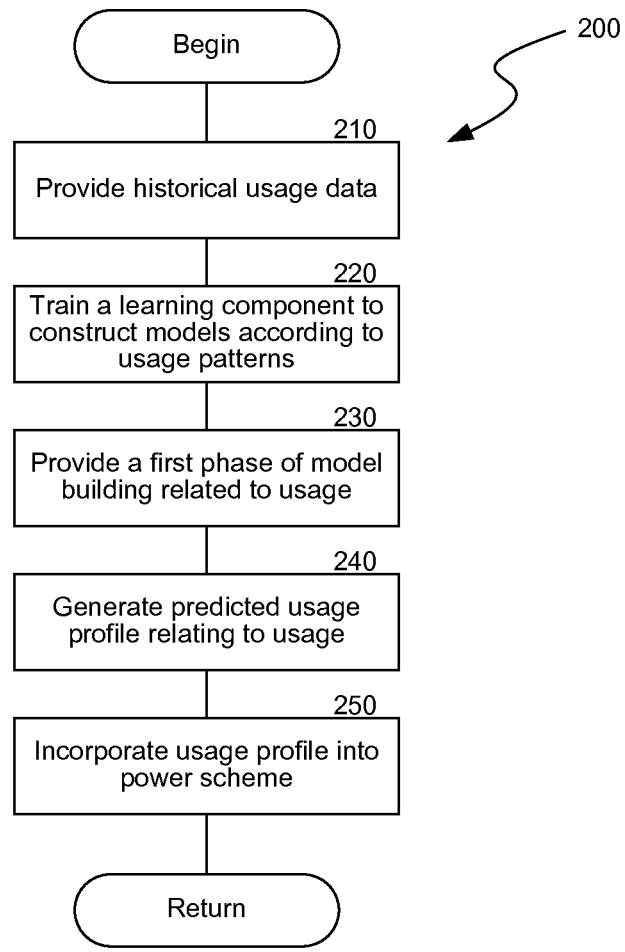
FIG. 2 is a flow diagram depicting steps performed by a system for managing power supply for an electronic device.

One embodiment provides a computer implemented system for managing power supply for an electronic device. FIG. 2 is a block diagram of a system 100 for managing power supply for an electronic device. The system comprises the following computer executable components: a learning component 110 that is trained and constructs models according to usage patterns of the electronic device, a model building component 120, which provides a first phase of model building relating to usage of the electronic device; and a forecasting component 130 that employs the learning component and models to generate predictions relating to usage of the electronic device.

Another embodiment provides a system wherein the electronic device is a computer.

Yet another embodiment provides a system wherein the forecasting component generates a predicted usage profile.

A further embodiment provides a system wherein the predicted usage profile is matched with a power profile and components of the computer are powered on or off based on the predicted usage profile.

Still another embodiment provides a system wherein the predicted usage profile comprises a discretization of usage data, whereby the size of usage tables is reduced.

The systems and methods provided herein contemplate other methods of quantization of data. One advantage of such methods is reduction in the size of the tables required for implementing some of the features described herein.

One embodiment provides a system the predicted usage profile comprises states selected from "unused," and "used".

In one embodiment, the system may employ a user-configured power usage scheme when the predicted usage profile indicates an "unused" state and the system maintains the electronic device powered on or in an "on" state when the predicated usage profile is predicting a "used" state. One advantage is that the user is provided for a tool to adopt an aggressive power usage scheme while taking advantage of the option provided by the system in suspending the user-configured power usage scheme when the system predicts a "used" state.

Still another embodiment provides a system wherein the predicted usage profile comprises states selected from one or more of "unused," "light usage," and "heavy usage".

A further embodiment provides a system wherein the power profile keeps all peripherals on and the system ready to use during a "heavy usage" period.

One embodiment provides a system wherein the predicted usage profile comprises indication of device "heavy usage" and selection of a power scheme that keeps all peripherals and the device on and ready to use.

Another embodiment provides a system wherein the predicted usage profile comprises indication of device "light usage" and selection of a power scheme that powers off some peripherals after a predetermined period of inactivity to conserve power.

Yet another embodiment provides a system wherein the predicted usage profile comprises indication of "unused" device, and selection of a power scheme that powers off or hibernates the entire system after a predetermined period of inactivity.

It should be noted that a particular power scheme may be applied as a result of the predicted profile.

In one embodiment the forecasting component determines complementary information relating to how long a system is expected to be in "heavy use," "light use" or "unused."

Another embodiment provides a system further comprising predicting a wake up profile whereby the system is powered on.

Another embodiment provides a system wherein the learning component includes one or more probabilistic learning models for reasoning about the usage states.

Yet another embodiment provides a system wherein the learning component includes one or more of a statistical model, a mathematical model, a simple model, a simple probability model, non-stationary Markov chains, a Bayesian dependency model, a naive Bayesian classifier, Bayesian networks, a times series model, a decision trees model, a Support Vector Machine (SVMs), a neural network, a probabilistic model, and a Hidden Markov Model.

Another embodiment provides a system wherein the learning component includes a naive Bayesian model.

In one embodiment the system assumes a variable $T_i$ for the $i^{th}$ time period and calculates $P(T_{n+1}|T_1,T_2,\ldots T_n)$ to compute usage probability.

In another embodiment the system calculates $P(T_{n+1}|T_1, T_2, \ldots T_n)$ as follows:

$$P(T_{n+1}|T_1, T_2, \ldots T_n) = \frac{P(T_1, \ldots, T_{n+1})}{P(T_1, \ldots, T_n)}$$

$$= \frac{P(T_1|T_2 \ldots T_{n+1})P(T_2 \ldots T_{n+1})}{P(T_1, \ldots, T_n)}$$

$$= \frac{P(T_1|T_2 \ldots T_{n+1})P(T_2|T_3 \ldots T_{n+1}) \ldots P(T_n|T_{n+1})P(T_n+1)}{P(T_1, \ldots, T_n)}.$$

In still another embodiment the system further includes the assumption: $P(T_i|T_{i+1},T_{i+2},\ldots T_{n+1})=P(T_i|T_{i+1})$, and calculates $$P(T_{n+1}|T_1, T_2, \ldots T_n) \approx \frac{P(T_{n+1})\prod_{i=1}^{n} P(T_i|T_{n+1})}{P(T_1, \ldots, T_n)}$$

In yet another embodiment the systems evaluates the likelihood of usage status of the computer by evaluating the ratio:

$$\frac{P(T_{n+1} = 1 | T_1, T_2, \ldots T_n)}{P(T_{n+1} = 0 | T_1, T_2, \ldots T_n)}$$

Where $T_i=1$ indicates the computer is used and $T_i=0$ indicates the computer is unused, whereby the computer is more likely to be used than not when the value of the ratio is greater than 1.

Another embodiment provides a system wherein evaluating the likelihood of usage comprises calculating the ratio:

$$\frac{P(T_{n+1} = 1 | T_1, T_2, \ldots T_n)}{P(T_{n+1} = 0 | T_1, T_2, \ldots T_n)} \approx \frac{P(T_{n+1} = 1) \prod_{i=1}^{n} P(T_i | T_{n+1} = 1)}{P(T_{n+1} = 0) \prod_{i=1}^{n} P(T_i | T_{n+1} = 0)}.$$

Another embodiment provides a system wherein evaluating the likelihood of usage comprises calculating the logarithm of the ratio calculated above.

Another embodiment provides a system wherein evaluating the likelihood of usage comprises including one or more additional variables.

Another embodiment provides a system wherein evaluating the likelihood of usage comprises including an additional variable to reflect a particular day of the week and evaluating the ratio:

$$\frac{P(T_{n+1} = 1) P(W | T_{n+1} = 0) \prod_{i=1}^{n} P(T_i | T_{n+1} = 1)}{P(T_{n+1} = 0) P(W | T_{n+1} = 0) \prod_{i=1}^{n} P(T_i | T_{n+1} = 0)} \quad (2)$$

Wherein W=1; 2; 3; 4; 5; 6; 7 and represent a day of the week.

Another embodiment provides a system wherein evaluating the likelihood of usage comprises collecting a historical value for $P(W|T_{n+1})$.

Another embodiment provides a system wherein evaluating the likelihood of usage comprises including an additional variable to reflect usage of one or more external resource.

The systems and methods provided herein contemplate incorporation of information obtained from a myriad of external resources. For example, and without limitation, such resources may include information relating to the presence or absence of Bluetooth devices, integration with building access control, integration with building managements systems, information obtained from sensors (e.g.; sensors associated with building management systems), and use or lack of usage of other systems.

Another embodiment provides a system wherein evaluating the likelihood of usage comprises including an additional variable to reflect one or more of:
i. meeting information from calendaring software like Microsoft Outlook;
ii. day of week;
iii. day of quarter;
iv. holiday information;
v. usage of another device or system connected through a network;
vi. presence or absence of a Bluetooth device; and
vii. information from a building management or access control device.

Another embodiment provides a system wherein the probabilistic learning model uses a discrete time period repeated over a predetermined total period of time.

In accordance with the subject systems and methods, the time period is selected after analysis of the usage patterns. For example, the time period is selected so that it is in sync with the natural usage patterns of the system Another embodiment provides a system wherein the probabilistic learning model uses a discrete time period repeated over a total period of 8 hours, 12 hours, 16, hours, 24 hours, 30 hours, 36 hours, 48 hours, 60 hours or 72 hours.

Another embodiment provides a system further comprising a slider component which allows a user to set a required likelihood that the device is in a selected usage state before applying a power scheme associated with the selected usage state.

In accordance with the present systems and methods, the slider provides several advantages. For example, the slider allows the user to adjust a tradeoff between accuracy-convenience and power savings. Allowing a low threshold for activating a power profile based on the predicted usage will tend to optimize savings but may lead to less convenience as users may need to override the applied power scheme. On the other hand, raising the threshold for applying the power scheme would tend to reduce the s Another embodiment provides a system wherein the required likelihood is set by a user to reflect a bias towards power savings.

One embodiment provides a system wherein the slider comprises a selected value between 0 and 100; whereby a determination that a logarithm ratio computed above exceeds the selected value results in a prediction that the device is in the state indicated by the predicted profile.

Another embodiment provides a computer implemented method for managing power supply for an electronic device. FIG. 2 is a flow diagram of a process 200 for managing power supply for an electronic device. The process includes the following:
i) at a block 210, the system provides historical usage data;
ii) at block 220, the system trains a learning component to construct models according to usage patterns of the electronic device,
iii) at a block 230, the system provides a first phase of model building relating to usage of the electronic device;
iv) at a block 240, the system generates predicted usage profile relating to usage of the electronic device; and
v) at a block 250, the system incorporates the usage profile into a power scheme for power supply to the device.

Another embodiment provides a method wherein the electronic device is a computer.

Another embodiment provides a method further comprising discretization of usage data, whereby the size of usage tables is reduced.

One embodiment provides a system the predicted usage profile comprises states selected from "unused," and "used".

Another embodiment provides a method wherein the predicted usage profile comprises states selected from one or more of "unused," "light usage," and "heavy usage".

One embodiment provides a method wherein the predicted usage profile comprises indication of device "heavy usage" and selection of a power scheme that keeps all peripherals and the device on and ready to use.

Another embodiment provides a method wherein the predicted usage profile comprises indication of device "light usage" and selection of a power scheme that powers off some peripherals after a predetermined period of inactivity to conserve power.

Yet another embodiment provides a method wherein the predicted usage profile comprises indication of "unused" device, and selection of a power scheme that powers off or hibernates the entire system after a predetermined period of inactivity.

Another embodiment provides a method further comprising including complementary information relating to how long a system is expected to be in "heavy use," "light use" or "unused."

Another embodiment provides a method further comprising predicting a wake up profile whereby the system is powered on.

Another embodiment provides a method comprising one or more probabilistic learning models for reasoning about the usage states.

Another embodiment provides a method wherein the learning model includes one or more a statistical model, a mathematical model, a simple model, a simple probability model, non-stationary Markov chains, a Bayesian dependency model, a naive Bayesian classifier, Bayesian networks, a times series model, a decision trees model, a Support Vector Machine (SVMs), a neural network, a probabilistic model, and a Hidden Markov Model.

Another embodiment provides a method wherein the learning model includes a naive Bayesian model.

Another embodiment provides a method wherein the method assumes a variable $T_i$ for the $i^{th}$ time period and calculates $P(T_{n+1}|T_1, T_2, \ldots T_n)$ to compute usage probability.

Another embodiment provides a method comprising calculating $P(T_{n+1}|T_1, T_2, \ldots T_n)$ as follows:

$$P(T_{n+1}|T_1, T_2, \ldots T_n) = \frac{P(T_1, \ldots, T_{n+1})}{P(T_1, \ldots, T_n)}$$

$$= \frac{P(T_1|T_2 \ldots T_{n+1})P(T_2 \ldots T_{n+1})}{P(T_1, \ldots, T_n)}$$

$$= \frac{P(T_1|T_2 \ldots T_{n+1})P(T_2|T_3 \ldots T_{n+1}) \ldots P(T_n|T_{n+1})P(T_n+1)}{P(T_1, \ldots, T_n)}.$$

Another embodiment provides a method wherein the method further includes the assumption: $P(T_i|T_{i+1}, T_{i+2}, \ldots T_{n+1}) = P(T_i|T_{i+1})$, and calculates $$P(T_{n+1}|T_1, T_2, \ldots T_n) \approx \frac{P(T_{n+1}) \prod_{i=1}^{n} P(T_i|T_{n+1})}{P(T_1, \ldots, T_n)}$$

Another embodiment provides a method comprising evaluating the likelihood of usage status of the computer by evaluating the ratio:

$$\frac{P(T_{n+1} = 1|T_1, T_2, \ldots T_n)}{P(T_{n+1} = 0|T_1, T_2, \ldots T_n)}$$

Where $T_i=1$ indicates the computer is used and $T_i=0$ indicates the computer is unused, whereby the computer is more likely to be used than not when the value of the ratio is greater than 1.

Another embodiment provides a method wherein evaluating the likelihood of usage comprises calculating the ratio:

$$\frac{P(T_{n+1} = 1|T_1, T_2, \ldots T_n)}{P(T_{n+1} = 0|T_1, T_2, \ldots T_n)} \approx \frac{P(T_{n+1} = 1) \prod_{i=1}^{n} P(T_i|T_{n+1} = 1)}{P(T_{n+1} = 0) \prod_{i=1}^{n} P(T_i|T_{n+1} = 0)}.$$

Another embodiment provides a method wherein evaluating the likelihood of usage comprises calculating the logarithm of the ratio calculated above.

Another embodiment provides a method wherein evaluating the likelihood of usage comprises including one or more additional variables.

Another embodiment provides a method wherein evaluating the likelihood of usage comprises including an additional variable to reflect a particular day of the week and evaluating the ratio:

$$\frac{P(T_{n+1} = 1)P(W|T_{n+1} = 0) \prod_{i=1}^{n} P(T_i|T_{n+1} = 1)}{P(T_{n+1} = 0)P(W|T_{n+1} = 0) \prod_{i=1}^{n} P(T_i|T_{n+1} = 0)} \quad (2)$$

Wherein W=1; 2; 3; 4; 5; 6; 7 and represent a day of the week.

Another embodiment provides a method wherein evaluating the likelihood of usage comprises collecting a historical value for $P(W|T_{n+1})$.

Another embodiment provides a method wherein evaluating the likelihood of usage comprises including an additional variable to reflect usage of one or more external resource.

Another embodiment provides a method wherein evaluating the likelihood of usage comprises including an additional variable to reflect one or more of:
  i. meeting information from calendaring software like Microsoft Outlook;
  ii. day of week;
  iii. day of quarter;
  iv. holiday information;
  v. usage of another device or system connected through a network;
  vi. presence or absence of a Bluetooth device; and
  vii. information from a building management or access control device.

Another embodiment provides a method wherein the probabilistic learning model uses a discrete time period repeated over a predetermined total period of time.

Another embodiment provides a method wherein the probabilistic learning model uses a discrete time period repeated over a total period of 8 hours, 12 hours, 16, hours, 24 hours, 30 hours, 36 hours, 48 hours, 60 hours or 72 hours.

Another embodiment provides a method further comprising providing a slider component which allows a user to set a required likelihood that the device is in a selected usage state before applying a power scheme associated with the selected usage state.

Another embodiment provides a method wherein the required likelihood is set by a user to reflect a bias towards power savings.

Another embodiment provides a method wherein the slider comprises a selected value between 0 and 100; whereby a determination that a logarithm ratio computed above exceeds the selected value results in a prediction that the device is in the state indicated by the predicted profile.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer implemented system for managing power supply to an entire computer, comprising the following computer executable components:
   a learning component that is trained and constructs one or more probabilistic learning models according to usage patterns of the computer, wherein the one or more probabilistic models is a naive Bayesian model;
   a forecasting component that employs the learning component and the one or more probabilistic models to generate predictions relating to predicted usage of the entire computer, wherein the system assumes a variable $T_i$ for the $i^{th}$ time period and calculates $P(T_{n+1}|T_1, T_2, \ldots T_n)$ to compute usage probability; and
   a component that selects a power profile based at least in part upon the generated predictions relating to predicted usage of the entire computer and powers off, hibernates, or powers on the entire computer based at least in part on the selected power profile.

2. The system of claim 1 wherein the forecasting component generates a predicted usage profile based upon the probabilistic learning model and values of one or more variables.

3. The system of claim 2 wherein the predicted usage profile is matched to a power profile and the component that manages the power supply to the entire computer powers on and off the entire computer based on the power profile.

4. The system of claim 3 wherein the predicted usage profile comprises a discretization of usage data, whereby the size of usage tables is reduced.

5. The system of claim 4 wherein the predicted usage profile comprises one or more states including one or more of "unused," "used," "light usage," and/or "heavy usage".

6. The system of claim 3 wherein the predicted usage profile is matched to a power profile that corresponds to a power scheme that keeps all peripherals and the entire computer on and ready to use.

7. The system of claim 3 wherein the predicted usage profile is matched to power profile that corresponds to a power scheme that powers off some peripherals after a predetermined period of inactivity to conserve power.

8. The system of claim 3 wherein the predicted usage profile is matched to power profile that corresponds to a power scheme that powers off or hibernates the entire system after a predetermined period of inactivity.

9. The system of claim 3 wherein the forecasting component further comprises predicting a wake up profile used to power on the entire computer.

10. The system of claim 2 wherein the values of the one or more variables reflect one or more of: presence or absence of Bluetooth devices, integration with building access control, integration with building management systems, information obtained from sensors, and/or use or lack of use of other systems.

11. The system of claim 2, wherein the forecasting component evaluates a predicted usage profile based upon the value of a variable that reflects a particular day of the week.

12. The system of claim 2, wherein the forecasting component evaluates a predicted usage profile based upon the value of a variable that reflects usage of one or more external resource.

13. The system of claim 2, wherein the forecasting component evaluates a predicted usage profile based upon the value of a variable that reflects one or more of:
   i. meeting information from calendaring software;
   ii. day of week;
   iii. day of quarter;
   iv. holiday information;
   v. usage of another device or system connected through a network;
   vi. presence or absence of a Bluetooth device; and
   vii. information from a building management or access control device.

14. The system of claim 1 wherein at least one of the probabilistic learning models uses a discrete time period repeated over a predetermined total period of time.

15. The system of claim 14 wherein the at least one of the probabilistic learning models uses a discrete time period repeated over a total period of 8 hours, 12 hours, 16, hours, 24 hours, 30 hours, 36 hours, 48 hours, 60 hours or 72 hours.

16. The system of claim 1 further comprising a slider component that receives from a user a required likelihood that the computer is in a selected usage state before the component that manages power supply to the entire computer applies a power scheme associated with the selected usage state.

17. The system of claim 16 wherein the required likelihood received from the user reflects a bias towards power savings.

18. A computer implemented method for managing power supply to an entire computer, comprising:
   receiving historical usage data;
   training a learning component to construct one or more probabilistic learning models according to usage patterns of the computer, the one or more probabilistic models including at least one of a statistical model, a mathematical model, a simple probability model, non-stationary Markov chains, a Bayesian dependency model, a naive Bayesian classifier, Bayesian networks, a times series model, a decision tree model, a Support Vector Machine (SVMs), a neural network, a probabilistic model, and/or a Hidden Markov Model;
   generating a predicted usage profile relating to predicted usage of components of the computer or the entire computer using the one or more probabilistic models, wherein the method assumes a variable Ti for the $i^{th}$ time period and calculates $P(T_{n+1}|T_1, T_2, \ldots T_n)$ to compute usage probability; and
   incorporating the generated predicted usage profile into a power scheme for providing power supply to the entire computer, wherein the entire computer is powered on, hibernated, or powered off based at least in part on the power scheme.

19. The method of claim 18 wherein the predicted usage profile comprises one or more states that represent one or more of "unused," "used," "light usage," and/or "heavy usage" states.

20. The method of claim 18 wherein the incorporating the generated predicted usage profile into a power scheme for providing power supply to the computer provides at least one of a scheme that keeps all peripherals and the entire computer on and ready to use power, a scheme that that powers off some peripherals of the computer after a predetermined period of inactivity to conserve power, and/or a scheme powers off or hibernates the entire computer after a predetermined period of inactivity.

21. The method of claim 18 further comprising predicting a wake up profile used to power on the entire computer.

22. The method of claim 18, wherein the one or more probabilistic learning models includes a naive Bayesian model.

23. The method of claim 18, further comprising: evaluating the likelihood of usage of the computer based upon values of one or more additional variables.

24. The method of claim 23, wherein the values of at least one of the one or more variables reflect usage of one or more external resource.

25. The method of claim 23, wherein evaluating the likelihood of usage comprises evaluating a variable that reflects one or more of:
   i. meeting information from calendaring software;
   ii. day of week;
   iii. day of quarter;
   iv. holiday information;
   v. usage of another device or system connected through a network;
   vi. presence or absence of a Bluetooth device; and
   vii. information from a building management or access control device.

26. The method of claim 18 wherein at least one of the probabilistic learning models uses a discrete time period repeated over a predetermined total period of time.

27. The method of claim 18 further comprising providing a slider component that receives from a user an indication of a required likelihood that the entire computer is in a selected usage state before applying a power scheme associated with the selected usage state.

28. The method of claim 27 wherein the required likelihood is set by a user to reflect a bias towards power savings.

* * * * *